March 10, 1931.          A. J. THOMPSON          1,795,808
                            CLAMP
                       Filed June 22, 1929
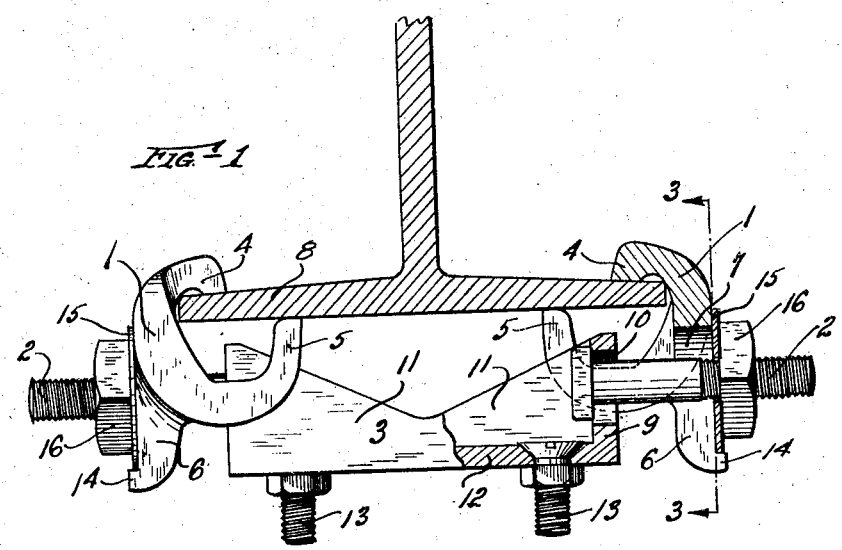
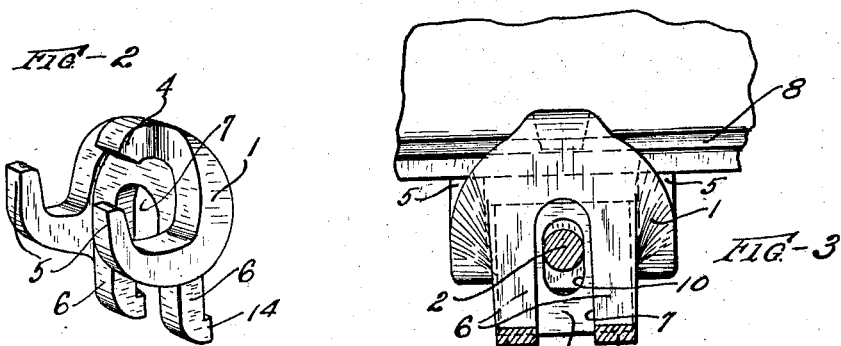
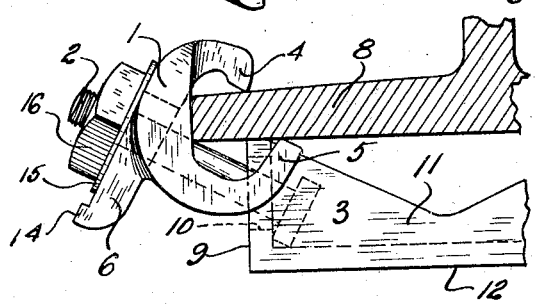
INVENTOR
ALLISON J. THOMPSON
BY
Brockett, Hyde, Higley & Meyer
ATTORNEYS Patented Mar. 10, 1931

1,795,808

UNITED STATES PATENT OFFICE

ALLISON J. THOMPSON, OF CLEVELAND, OHIO

CLAMP

Application filed June 22, 1929. Serial No. 373,044.

This invention relates to hanger means adapted for attachment to an I-beam for the purpose of supporting therefrom an electric lamp or other fixture.

The object of this invention is to provide in such a hanger, means for firmly engaging the lower I-beam flange on its edges as well as on its upper and lower faces whereby the I-beam is firmly grasped regardless of irregularities therein.

Further objects of the invention are to provide for such engagement in various sizes of I-beams having flanges of various dimensions; and to provide that the engagement of the flanges shall be all the more secure as the supported weight is applied to the hanger.

The exact nature of the invention together with further objects and advantages thereof will be apparent from the following description taken in connection with the accompanying drawings, in which Fig. 1 is an assembly view of an example of my hanger means applied to an I-beam, the lower portion only of the I-beam being shown, and this in section, and parts of the hanger means being also in section to show details of form thereof; Fig. 2 is a perspective view of one of the clamp members which forms a part of my invention; Fig. 3 is a vertical section as in the plane of line 3—3 Fig. 1; and Fig. 4 is a view corresponding with the showing of Fig. 1 and indicating in comparison therewith my hanger means applied to an I-beam having heavier flanges than as indicated in Fig. 1.

With reference now to the drawings, the principal parts of my hanger means are the clamp members 1, means for tightening clamp members upon the I-beam flanges, such as the bolts 2, and which tightening means may include a base member 3 designed for convenient connection with the fixture to be supported.

The clamp members 1 are generally C-shaped in side elevation each having an upper claw 4 and a pair of spaced lower claws 5. Each clamp member also has a depending tail portion 6 slotted as indicated, at 7, to receive the tightening means.

Thus a clamp member applied as indicated at the left hand Fig. 1, to the flange 8 of an I-beam, and moved in counterclockwise direction, will engage the flange at three points, the claw 4 engaging the upper face of the flange and the claws 5 engaging the lower face.

The tail 6 provides a leverage for so rotating the clamp.

In the assembly a pair of clamps are spaced oppositely on the edges of the lower I-beam flange 8 as indicated, Fig. 1, so that a single bolt could extend between the tail portions thereof and thus serve to tighten the clamps upon the I-beam, tightening of the bolt obviously exerting leverage through the tail portions of both clamps and tending not only to rotate the clamps to cause their claws to engage the I-beam flange, but tending to move the clamps toward each other so that the edges as well as the faces of the flange are engaged.

Conveniently, however, a base member 3 is arranged between the tail portions of the clamps extending as indicated between the lower claws 5 of each clamp, and the pair of tightening bolts 2 associated therewith. In such case the member 3 may be generally of box shape, with open top and end portions 9 slotted as at 10 to receive the bolts 2. Thus the side portions 11 of the member 3 strengthen the end portions thereof, and the bottom 12 may be apertured to receive the bolts 13 for securing the fixture to be supported with the base member 3.

The ends of the tail portions 6 of the clamp members are provided with outstanding lugs 14; and the bolts 2 are provided with washers 15 under their nuts 16, the washers, and hence the bolts, being thus supported as before tightening, by these lugs.

It will be apparent that when the assembly is made as in Fig. 1 tightening of the nuts 16 will tighten the assembly securing the clamp members with the I-beam flange and supporting the base member 3 thereby with equal security. Also, by proper manipulation of the nuts 16 the base member 3 may be adjusted transversely. Thereafter, as a load is applied to the base member 3 additional force will be exerted upon the tail portions 6 of the clamp claws to all the more firmly engage the I-beam flange.

Likewise, where the flange is large as in Fig. 4 the general arrangement of the parts will be similar to the showing Fig. 1 except that the tightening bolts 2 will be angularly disposed. So also will the tail portions of the clamp members be angularly disposed, so that the base member 3 will be brought up to engagement with the lower face of the I-beam flange. Here, when the load is applied forces will be transmitted by the bolts 2 in the directions in which they lie and thus more directly to the flange than as in Fig. 1.

What I claim is:

1. A clamp member for the purpose described, generally of C-shape with upper and lower claw portions for engaging opposite faces of an I-beam flange, said lower claw portion being split to provide a pair of spaced claws, whereby said flange will be engaged at three points, and said member having a depending tail portion split to provide a downwardly opening slot to receive a securing bolt extending between said lower claws.

2. A clamp member for the purpose described, generally of C-shape with upper and lower claw portions for engaging opposite faces of an I-beam flange, said lower claw portion being split to provide a pair of spaced claws, whereby said flange will be engaged at three points, and said member having a depending tail portion split to provide a downwardly opening slot to receive a securing bolt extending between said lower claws, said tail portion having an outstanding lug adapted to engage the head portion of said bolt to maintain said bolt in its described association with said clamp member.

3. Hanger means of the class described comprising a pair of C-shaped clamp members adapted to engage opposite flanges of an I-beam, a base member adapted for disposition between said clamp members to support a fixture from said I-beam, each of said clamp members having a bolt-receiving opening and said base member having a corresponding pair of openings, and a pair of bolts each securing one of said clamp members with the corresponding end of said base member.

4. Hanger means of the class described comprising a pair of C-shaped clamp members adapted to engage opposite flanges of an I-beam, a base member adapted for disposition between said clamp members to support a fixture from said I-beam, each of said clamp members having a bolt-receiving opening and said base member having a corresponding opening, and bolt means extending through said openings to secure the clamp members on their flanges.

In testimony whereof I hereby affix my signature.

ALLISON J. THOMPSON.